UNITED STATES PATENT OFFICE.

MAX KUGEL, OF WIESDORF, NEAR COLOGNE, GERMANY, ASSIGNOR TO FARBENFABRIKEN OF ELBERFELD CO., OF NEW YORK, N. Y., A CORPORATION OF NEW YORK.

YELLOW ANTHRACENE DYE.

No. 808,762. Specification of Letters Patent. Patented Jan. 2, 1906.

Application filed September 18, 1905. Serial No. 278,943.

*To all whom it may concern:*

Be it known that I, MAX KUGEL, doctor of philosophy, chemist, residing at Wiesdorf, Leverkusen No. 21, near Cologne, Germany, (assignor to the FARBENFABRIKEN OF ELBERFELD Co., of New York,) have invented a new and useful Improvement in Anthracene Dyes; and I hereby declare the following to be a clear and exact description of my invention.

In the United States Letters Patent No. 775,369, dated November 22, 1904, I have described a blue dyestuff which is obtained by heating 1-3-dibromo-2-amidoanthraquinone with cupric chlorid and a suitable liquid in presence of weakly-alkaline substances. I have now found that a yellow coloring-matter is obtained by carrying out this process in the presence of strongly-alkaline agents, such as caustic soda, caustic potash, sodium amid, &c.

In carrying out my process practically I can proceed as follows, the parts being by weight: A mixture of one hundred (100) parts of 1-3-dibromo-2-amidoanthraquinone, one thousand (1,000) parts of nitrobenzene, five (5) parts of cupric chlorid, ($CuCl_2$,) and forty (40) parts of powdered sodium hydroxid is heated for from two (2) to four (4) hours to one hundred and fifty degrees (150°) centigrade. When a test portion shows no further increase in the production of the dye, the reaction is completed. After the mass of the reaction has cooled to one hundred (100) degrees centigrade the precipitate is filtered off with suction and washed with nitrobenzene, alcohol, and dilute hydrochloric acid.

My new dyestuff is thus obtained either alone or in admixture with the blue dye described in United States Patent No. 775,369, from which it may be separated as follows: The mixture of the two coloring-matters is dissolved in thirty (30) parts of sulfuric acid of 66° Baumé and thirty (30) parts of sulfuric acid of 60° Baumé are then slowly added under stirring. The blue dye separates out in crystals while cooling. It is filtered off, the filtered liquid is run into water, and the yellow dye which separates is filtered off.

My new coloring-matter is thus obtained in the shape of microscopic yellow needles. It is soluble in concentrated sulfuric acid with a yellowish-orange color. Upon treatment with hydrosulfite and caustic-soda lye it forms a blue vat, from which unmordanted cotton is dyed blue, which becomes brownish yellow when exposed to the air.

Having now described my invention and in what manner the same is to be performed, what I claim as new, and desire to secure by Letters Patent, is—

The herein-described new brownish-yellow dyestuff which can be obtained from 1-3-dibromo-2-amidoanthraquinone, which is a yellow substance soluble in concentrated sulfuric acid with a yellowish-orange color; giving a blue vat with hydrosulfite and caustic-soda lye, which vat dyes unmordanted cotton blue shades, which shades become brownish yellow when exposed to the air, substantially as hereinbefore described.

In testimony whereof I have signed my name in the presence of two subscribing witnesses.

MAX KUGEL.

Witnesses:
OTTO KÖNIG,
WALTHER WIBER.